Figure 1:
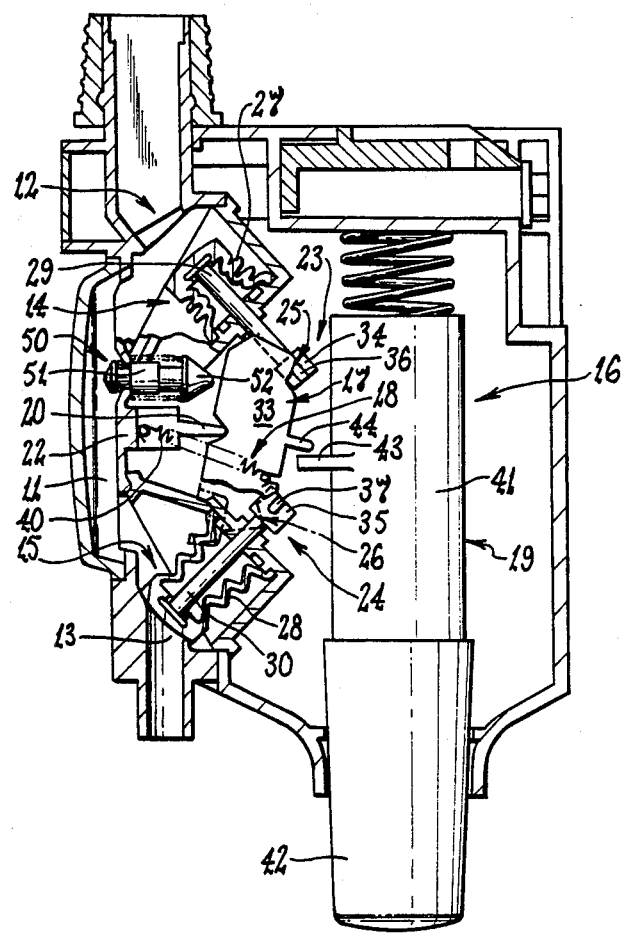

United States Patent [19]

Bayly et al.

[11] Patent Number: 4,805,815

[45] Date of Patent: Feb. 21, 1989

[54] METERING DISPENSER

[75] Inventors: Peter K. Bayly, Kangaroo Ground; John E. Oretti, Doncaster; Michael J. Mote, Glen Iris, all of Australia

[73] Assignee: Peter Bayly Associates Australia Pty. Ltd., Balwyn, Australia

[21] Appl. No.: 896,322

[22] Filed: Aug. 18, 1986

Related U.S. Application Data

[63] Continuation-in-part of Ser. No. 601,323, Apr. 17, 1984, abandoned.

[30] Foreign Application Priority Data

Apr. 22, 1983 [AU] Australia .................... PF9029

[51] Int. Cl.[4] ............................................. G04C 23/00
[52] U.S. Cl. .................................. 222/644; 222/425; 222/449; 222/448; 222/451; 222/506
[58] Field of Search ............... 222/644, 642, 309, 339, 222/340, 504, 424.5, 425, 444–453, 506, 511

[56] References Cited

U.S. PATENT DOCUMENTS

| 3,380,629 | 4/1968 | Kontrao et al. | 222/504 X |
| 3,913,807 | 10/1975 | Lale et al. | 222/449 X |
| 4,266,697 | 5/1981 | Zissimopoulos | 222/450 |
| 4,308,978 | 1/1982 | Bayly et al. | 222/449 |
| 4,440,326 | 4/1984 | Bayly et al. | 222/449 X |
| 4,487,333 | 12/1984 | Pounder et al. | 222/504 X |

FOREIGN PATENT DOCUMENTS

| 2644151 | 4/1978 | Fed. Rep. of Germany | 222/642 |
| 2387438 | 11/1978 | France . | |
| 569857 | 8/1977 | U.S.S.R. | 222/644 |
| 2101088 | 1/1983 | United Kingdom . | |

Primary Examiner—Joseph J. Rolla
Assistant Examiner—David H. Bollihger
Attorney, Agent, or Firm—Stevens, Davis, Miller & Mosher

[57] ABSTRACT

A metering dispenser including a metering chamber having an inlet port and an outlet port, an inlet valve for admitting flowable material to the metering chamber through the inlet port, an outlet valve for allowing discharge of the material. To control operation of the inlet and outlet valves, a valve control member is operatively associated with the inlet and outlet valves and is pivotally movable between two extreme limits of pivotal movement which correspond respectively to fill and discharge conditions of the dispenser. A control biasing spring is associated with the valve control member and biases the valve control member towards the one of the extreme limits of pivotal movement corresponding to the dispenser being in the fill condition. An actuator is operative to move the valve control member against the action of the biasing spring. The valve control may be mechanically operative to control operation of the inlet and outlet valves. Alternatively the valve control may be electrically operable and include a timer operative to generate a timing signal and electrically operable valve operator responsive to the timing signal to change the dispenser from its fill to its discharge condition and to return the dispenser from its discharge to its fill condition after material discharge.

24 Claims, 5 Drawing Sheets

METERING DISPENSER

This application is a continuation-in-part of application Ser. No. 601,323, filed Apr. 17, 1984, now abandoned.

This invention relates to dispensers for liquids, powders, and other flowable materials and is particularly concerned with such dispensers having a metering facility. It will be convenient to hereinafter describe the invention with particular reference to liquid metering dispensers, but the invention is not limited to this particular use.

Liquid metering dispensers are commonly used for beverages in establishments catering to the public and it is therefore necessary that they be both accurate and hygenic in use. Many dispensers used in the past have generally failed to meet at least one if not both of these requirements. Metering devices developed in the past for overcoming these problems are described in U.S. Pat. Nos. 4,308,978 and 4,440,326.

The present invention relates to metering dispensers of the same general kind as shown in this prior art. Such dispensers include a metering chamber, an inlet valve for admitting flowable material to the metering chamber, an outlet valve for allowing discharge of material from the metering chamber and valve control means operative to control operation of the inlet and outlet valves so as to change the condition of the dispenser between a fill condition in which the inlet valve is open and the outlet valve is closed and a discharge condition in which the outlet valve is open and the inlet valve is closed. Such a metering dispenser will be referred to hereinafter when convenient as a dispenser "of the kind described".

In U.S. Pat. No. 4,308,978 there is shown a mechanical valve control means including a valve control member which consists of a yoke which is movable between two extreme positions corresponding respectively to the fill and discharge conditions and having an intermediate unstable position through which the yoke must pass to change from one position to the other, the yoke being spring biased so that when in its intermediate position under the influence of a biasing spring to either of the two extreme positions. This mechanism was not found readily suitable for electrical operation and the valve operating mechanism shown in U.S. Pat. No. 4,440,326 was developed for electrical operation. The electrical system for operating the valve control means in U.S. Pat. No. 4,440,326 is relatively complex and expensive since it includes for example an electric motor, gearing and a cam member.

It is an object of the present invention to provide a metering dispenser of the kind described having a relatively simple and versatile valve operating mechanism.

It is a preferred object of the present invention to provide a metering dispenser of the kind described having a valve operating mechanism which is readily adapted for either mechanical or electrical operation.

It is a further object of the present invention to provide a metering dispenser of the kind described having a relatively simple and effective electrical operating system.

According to the present invention there is provided a metering dispenser including a metering chamber having an inlet port and an outlet port, an inlet valve for admitting flowable material to the metering chamber through the inlet port, an outlet valve for allowing discharge of the material from the metering chamber through the outlet port, and valve control means operative to control operation of the inlet and outlet valves so as to change the condition of the metering dispenser between a fill condition in which the inlet port is open and the outlet port is closed and a discharge condition in which the outlet port is open and the inlet port is closed, said valve control means including: a valve control member operatively associated with the inlet and outlet valves and being pivotally movable between two extreme limits of pivotal movement which correspond respectively to the fill and discharge conditions, control biasing means associated with the valve control member and which biases the valve control member towards the one of said extreme limits of pivotal movement corresponding to the dispenser being in the fill condition, and actuating means operative to move the valve control member against the action of the biasing means to change the dispenser from its fill condition to its discharge condition for a predetermined time allowing discharge of material from the metering chamber through the outlet port.

The valve control member is preferably pivotally movable about a point located between the inlet and outlet valves.

The actuating means is preferably operative, after material discharge, to allow the valve control member to return under the action of the control biasing means, to its initial position in which the dispenser is in the fill condition.

Preferably, the general arrangement of the metering chamber and inlet and outlet valves may be the same as described in the prior art patent specifications referred to earlier. In particular, the metering chamber preferably includes a rear wall, the inlet and outlet valves having rearwardly extending tail portions which extend beyond the rear wall and which are operated upon to open the inlet and outlet ports. In this arrangement, the pivoted valve control member is preferably mounted between the tail portions of the inlet and outlet valves and being provided with operating portions associated with the respective tail portions, each of the inlet and outlet valves including a respective associated valve biasing means biasing the associated valve into its port closing position, the strength of the biasing force of the valve biasing means being less than the strength of the biasing force of the control biasing means, whereby in the fill condition of the dispenser, the inlet valve holds the inlet port open against the closing force of the associated valve biasing means and the outlet valve holds the outlet port closed under the action of the associated valve biasing means.

The actuating means is preferably operative, after causing change of the dispenser from its fill to its discharge condition, to prevent return of the valve control member to its initial position for a predetermined time until a predetermined proportion of the material in the metering chamber is discharged.

In one possible embodiment, the actuating means comprises a mechanical actuating means operative initially to move the valve control member against the action of the control biasing means to change the dispenser from its fill condition to its discharge condition and to delay return of the valve control member to its initial position for a sufficient period of time to allow discharge of the flowable material, the actuating means including a manually operable plunger movable in response to user actuation and causing movement of the valve control member from its initial position to its other extreme limit of pivotal movement corresponding to the discharge condition of the dispenser.

In the alternative possible arrangement, the valve control means is electrically operable for changing the dispenser between its fill and discharge conditions, the electrically operable valve control means including timing means operative to generate a timing signal and electrically operable valve operating means which is responsive to the timing signal to change the dispenser from its fill to its discharge condition and to maintain the dispenser in its discharge condition for a predetermined discharge time allowing discharge of the flowable material from the metering chamber, the valve operating means being also operate to return the dispenser from its discharge to its fill condition after contents discharge.

Preferably the dispenser includes lost motion means operative so that the inlet valve closes the inlet port before the outlet valve opens the outlet port in changing of the dispenser from its fill condition to its discharge condition. Preferably furthermore the lost motion means is also operative so that in changing of the dispenser from its discharge to its fill condition, the outlet valve closes the outlet port before the inlet valve opens the inlet port.

According to the present invention there is also provided a metering dispenser including a metering chamber having an inlet port an outlet port, and inlet valve for admitting flowable material to the metering chamber through the inlet port, an outlet valve for allowing discharge of material from the metering chamber through the outlet port, and valve control means operative to control operation of the inlet and outlet valves so as to change the condition of the dispenser between a fill condition in which the inlet port is opened and the outlet port is closed and a discharge condition in which the outlet port is opened and the inlet port is closed, said valve control means being electrically operable and including timing means operative to generate a timing signal, said valve control means further including electrically operable valve operating means responsive to the timing signal generated by the timing means to change the dispenser from its fill to its discharge condition and to maintain the dispenser in its discharge condition for a predetermined discharge period allowing discharge of flowable material from the metering chamber, the valve operating means being also operative to return the dispenser from its discharge to its fill condition after material discharge.

In one possible embodiment, the timing means is operative to generate a discharge timing signal representative of the duration that the dispenser is to be maintained in its discharge condition, the timing means including a pulse generator for generating pulses at a predetermined frequency and counter means for determining when a predetermined number of said pulses has been generated so as to determine the discharge period, the valve operating means being operative to change the dispenser from its discharge to its fill condition at the end of the discharge period determined by the counter means.

Preferably also the timing means is further operative to generate a disabling timing signal so as to prevent a restarting of the dispenser operating cycle for a predetermined time after return of the dispenser from the discharge to the fill condition, thereby enabling refilling of the metering chamber.

Conveniently the dispenser may include a valve control member operatively associated with the inlet and outlet valves and biasing means associated with the valve control member and biasing it into a position in which the dispenser is in its fill condition, the electrically operable valve operating means being operative to move the valve control member against the action of the biasing means to effect chancing of the dispenser from its fill to its discharge condition. In this embodiment the valve operating means may include a solenoid which is arranged to be energised for the duration of the discharge period so as to change the dispenser from the fill to the discharge condition and to maintain the dispenser in that condition for the duration of the discharge period. The solenoid may have an associated operating member movable in response to energisation of the solenoid, the operating member being mechanically associated with the valve control member to move the same.

Preferably the timing means is selectively adjustable so as to enable user selection of different discharge periods less than the period required for complete discharge of the metering chamber contents and thereby allow selection of quantities of material to be dispensed less than the full capacity of the metering chamber.

Figure 2:
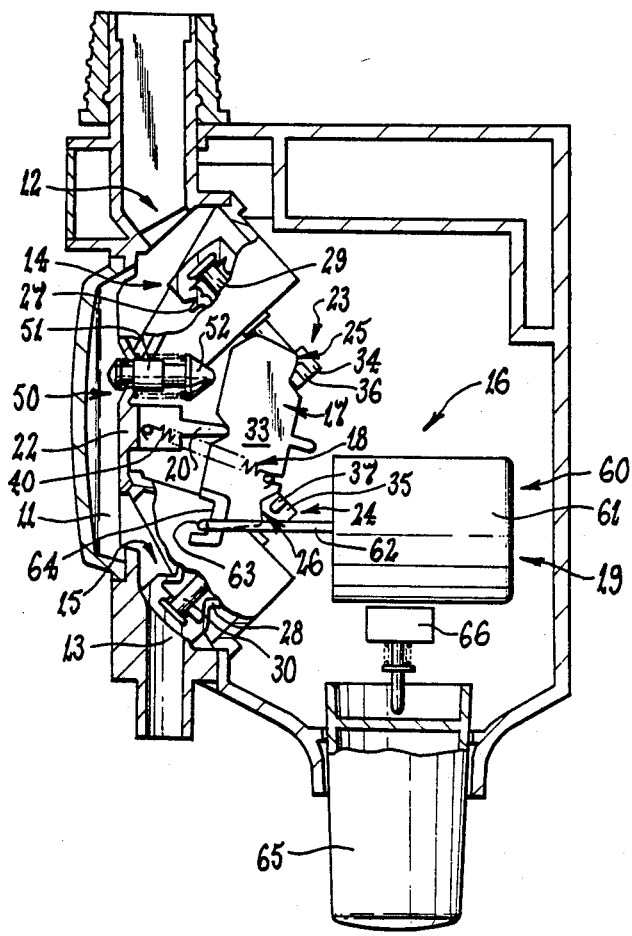
Figure 3:
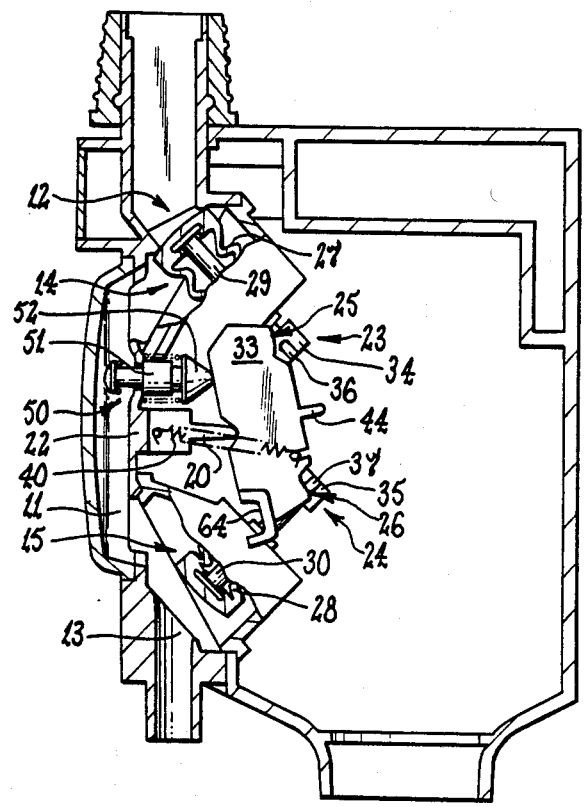
Figure 4:
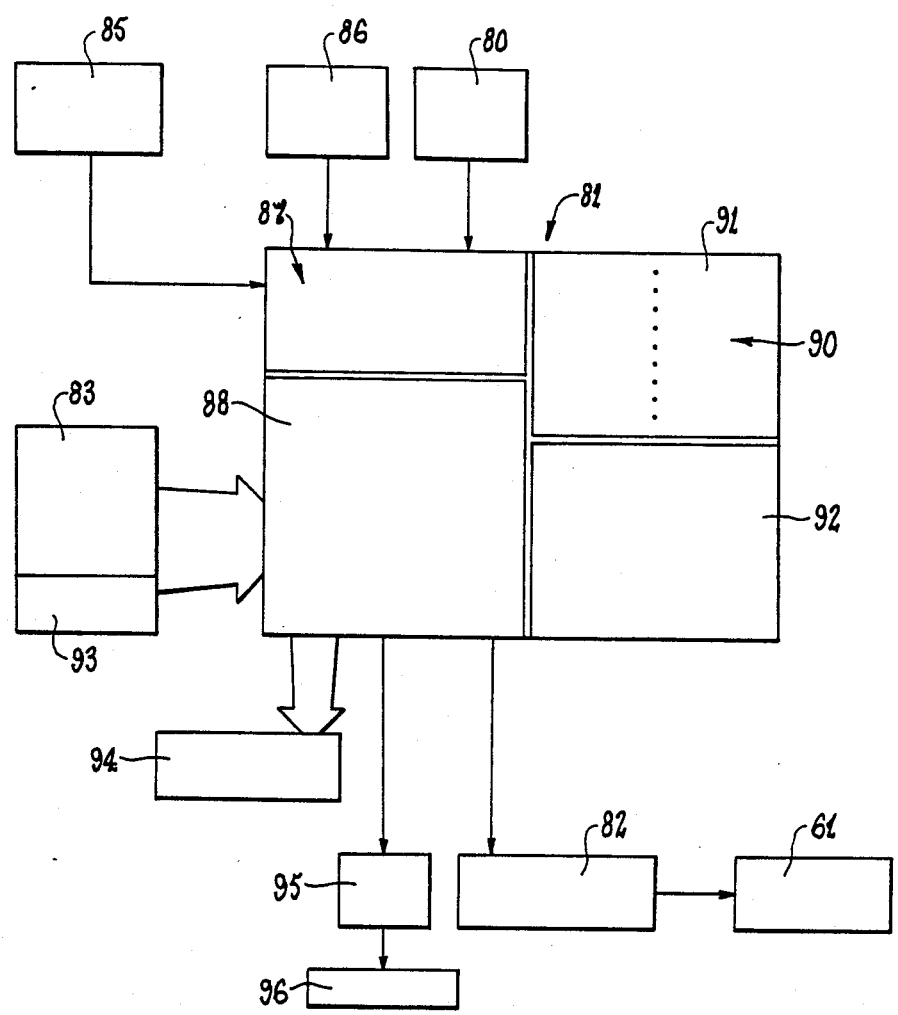
Figure 5:
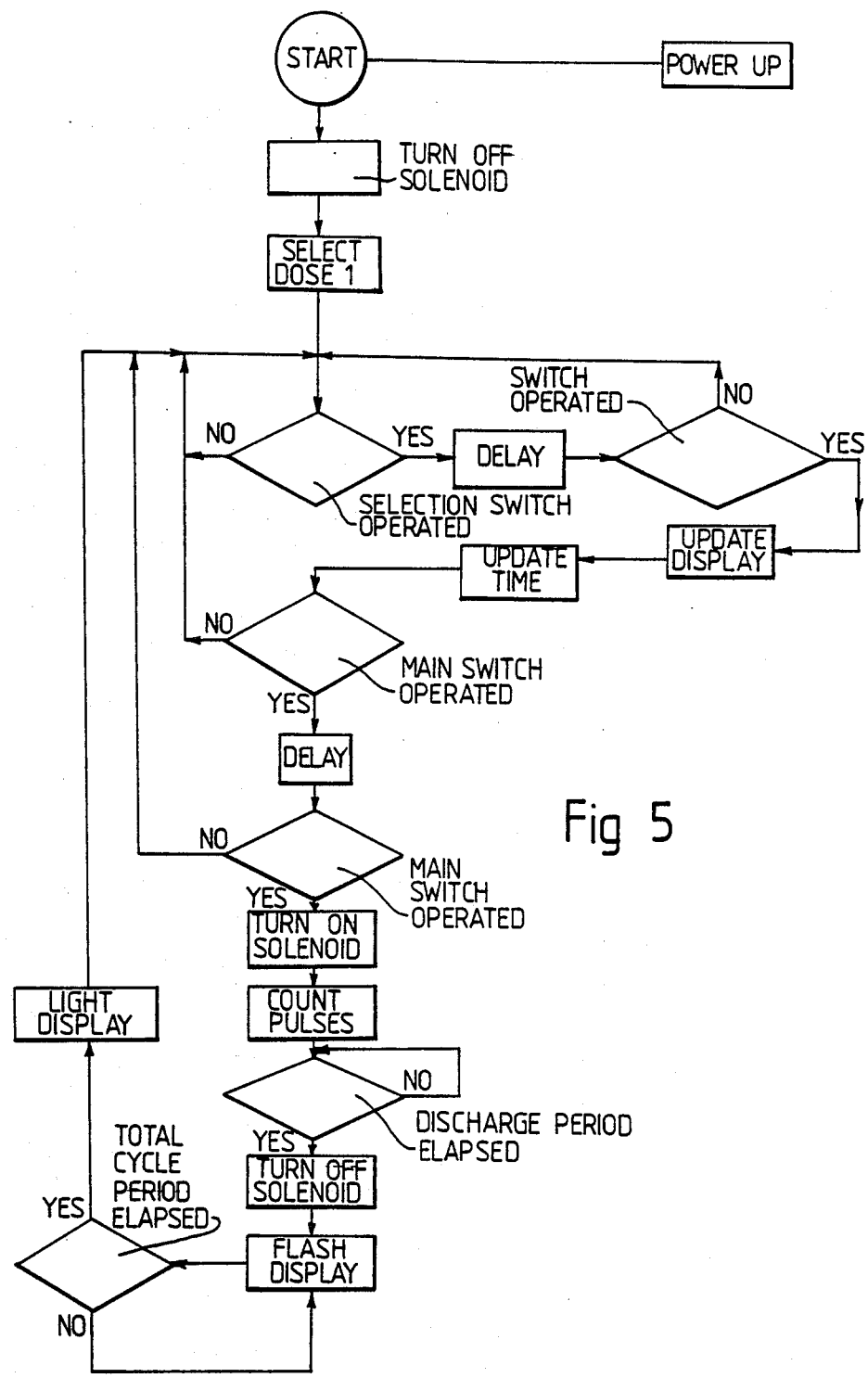

The present invention and possible preferred embodiments according to the present invention will now be described with particular reference to the accompanying drawings in which:

FIG. 1 is a side sectional view of a metering dispenser according to a first embodiment of the present invention in which mechanical actuating means are provided, FIG. 2 is a cross-sectional view of a metering dispenser according to a second preferred embodiment in which the valve control means is electrically operable, FIG. 3 is a cross-sectional view showing the dispenser according to either of the embodiments of FIGS. 1 and 2 in its discharge condition, FIG. 4 is a block circuit diagram of a valve control means usable with the dispenser of Figure 2, and FIG. 5 is a logic or flow diagram for operation of the microprocessor included in the circuit of FIG. 4.

The metering dispenser illustrated in the drawings includes a metering chamber 11 having an inlet port 12 and an outlet port 13. An inlet valve 14 is operative to admit flowable material to the metering chamber 11 through the inlet port 12 and outlet valve 15 is operative to allow discharge of the material from the chamber 11 through the outlet port 13. Valve control means 16 is operative to control operation of the inlet and outlet valves 14,15 so as to change the condition of the metering dispenser between a fill condition (FIGS. 1 and 2) in which the inlet port 12 is open and the outlet port 13 is closed, and a discharge condition (FIG. 3) in which the outlet port 13 is open and the inlet port 12 is closed.

The valve control means 16 includes valve control member 17 operatively associated with the inlet and outlet valves 14,15 and being pivotally movable between two extreme limits of pivotal movement which correspond respectively to the fill and discharge conditions. Control biasing means 18 is associated with the valve control member 17 and biases the valve control member 17 towards the one of the extreme limits of pivotal movement corresponding to the dispenser being in the fill condition (FIGS. 1 and 2). The valve control means 16 also includes actuating means 19 operative to move the valve control member 17 against the action of the biasing means 18 to change the dispenser from its fill to its discharge condition for a predetermined time allowing discharge of material from the chamber 11 through the outlet port 13.

The valve control member 17 is pivotally movable about a point or fulcrum 20 located between the inlet and outlet valves 14,15. As shown in FIGS. 1 and 2, in the fill condition of the dispenser, the pivoted member 17 is at one extreme limit of its range of pivotal movement and is normally maintained in that position by the control biasing means 18. However, after contents discharge, the actuating means 19 is operative to cause or allow the valve control member 17 to return under the action of the control biasing means 18 to its initial position in which the dispenser is in the fill condition.

As mentioned previously, preferably the general arrangement of the metering chamber 11 and inlet and outlet valves 14,15 is generally the same as described in U.S. Pat. Nos. 4,308,978 and 4,440,326. In this arrangement, the metering chamber 11 includes a rear wall 22 and the inlet and outlet valves 14,15 have rearwardly extending tail portions 23, 24 which extend beyond the rear wall 22 and which are operated upon to open the inlet and outlet ports 12,13. In this arrangement, the pivoted valve control member 17 is mounted between the tail portions 23,24 of the inlet and outlet valves 14,15 and is provided with operating portions 25,26 associated with the respective tail portions 23,24. As mentioned above, the control biasing means 18 biases the pivoted valve control member 17 into a position in which the inlet valve 14 holds the inlet port 12 open (FIGS. 1 and 2) and the outlet valve 15 closes the outlet port 13. Each of the inlet and outlet valves 14,15 includes a respective associated valve biasing means biasing the valve to its port closing position and which is in the form of a resilient sleeve 27,28 surrounding the valve stem 29,30. The strength of the biasing force of the resilient sleeves 27,28 is less than the strength of the biasing force of the control biasing means 18. Thus, in the fill condition of the dispenser, the inlet valve 14 holds the inlet port 12 open under the dominant action of the control biasing means 18 and against the closing force of the resilient sleeve 27, and the outlet valve 15 holds the outlet port 13 closed under the action of the resilient sleeve 28.

The valve control member 17 illustrated comprises a pivoted block 33 located rearwardly of the rear wall 22 of the metering chamber 11 and between the inlet and outlet valve tail portions 23,24. The block 33 is pivotally mounted on fulcrum 20 which is illustrated in the general form of a projection extending rearwardly from the rear wall 22 and located generally centrally between the inlet and outlet valve tail portions 23,24.

Each of the tail portions 23,24 of the inlet and outlet valves 14,15 is provided with a head portion 34,35. Each of the operating portions 25,26 of the valve control block 33 comprises an abuttment or shoulder on the valve control block. In the illustrated embodiments each head portion 34,35 includes a lateral projection 36,37 which is arranged to be engaged by the respective abuttment 25,26 when the valve control block 33 is pivoted about the fulcrum 20 so as to move the tail portion 23,24 of the valve 14,15 in the direction away from the associated port 12,13 to thereby operate the respective valve 14,15 to open the respective port 12,13.

The control biasing means 18 is directly associated with the valve control member 17 so as to act directly thereon and bias the valve control member 17 to its extreme limit of pivotal movement corresponding to the fill condition of the dispenser. The control biasing means 18 is illustrated as comprising a spring 40 extending between the pivoted valve control member 17 and a portion of the valve body. The point of connection of the spring 40 to the valve control member 17 being located to one side of the fulcrum 20 so that the spring 40 urges the valve control member 17 to its extreme limit of pivotal movement corresponding to the fill condition of the dispenser and as shown in FIGS. 1 and 2.

The actuating means 19 is operative, after causing change of the dispenser from its fill to its discharge condition, to prevent return of the valve control member 17 to its initial position for a predetermined time until a predetermined proportion of the material in the metering chamber 11 is discharged.

Referring now particularly to FIG. 1, the actuating means 19 comprises a mechanical actuating means operative initially to move the valve control member 17 against the action of the control biasing means 18 to change the dispenser from its fill condition to its discharge condition and to delay return of the valve control member 17 to its initial position for a sufficient period of time to allow discharge of the entire metering chamber contents or a predetermined proportion of the contents. The actuating means includes a manually operable plunger 41 which is movable in response to user actuation of the push-button 42 to cause movement of the valve control member 17 from its initial position to its other extreme limit of pivotal movement corresponding to the discharge condition of the dispenser. To achieve this, the plunger 41 includes a lateral projection 43 and the valve control member 17 includes a projecting operating arm 44, initial movement of the plunger 41 causing the lateral projection 43 to engage with the operating arm 44 and further movement of the plunger 41 cuasing pivotal movement of the valve control member 17, eventually to the position shown in FIG. 3 where the inlet port 12 is closed by the inlet valve 14 and the outlet port 13 is opened by the outlet valve 15. When the dispenser reaches its discharge condition as shown in FIG. 3, the operating arm 44 of the valve control member 17 is maintained in contact with the lateral projection 43 of the plunger 41 by action of the control biasing means 18 so that the plunger projection 43 prevents immediate return of the valve control member 17 to its initial position. The return of the plunger 41 to its original position as shown in FIG. 1 is preferably delayed and this may be achieved by any convenient means. For example, the push-botton and plunger construction may be generally as described in U.S. Pat. No. 4,308,978 in which an air bleed mechanism is used to delay return of the plunger and hence return of the valve control member 17 to its start position.

The dispenser illustrated in FIGS. 1 and 3 includes lost motion means operative so that the inlet valve 14 closes the inlet port 12 before the outlet valve 15 opens the outlet port 13 in changing of the dispenser from its fill condition to its discharge condition. The lost motion means is also operative so that in changing of the dispenser from its discharge to its fill condition, the outlet valve 15 closes the outlet port 13 before the inlet valve 14 opens the inlet port 12. The provision of lost motion means operative in this fashion ensures that both valves 14,15 cannot be open at the same time which would otherwise enable dispensing of an excess amount of material.

The lost motion means is provided by a degree of free travel of the valve control member 17 which, starting its pivotal movement from its initial extreme limit of pivotal movement in which the dispenser is in the fill condition (FIG. 1), allows the inlet valve 14 to close the inlet port 12 before the valve control member 17 operates the outlet valve 15 to open the outlet port 13 and achieve the discharge condition. Likewise, before the outlet valve 15 has been operated to open the outlet port 13 during the change from the fill to the discharge condition, the valve control member 17 disengages from the inlet valve 14 after it has closed so that when the dispenser is returning from the discharge to the fill condition, the valve control member 17 allows the outlet valve 15 to close the outlet port 13 before reengaging with the inlet valve 14 and opening the inlet port 12. In the particular preferred embodiment illustrated, in which the valve control member 17 comprises pivoted block 33 having abutments 25,26 which engage with projections 36,37 on the tail portions 23,24 of the valves 14,15, the free travel providing the lost motion means is achieved by enabling the abutments 25,26 on the valve control block 33 to disengage from the projections 36,37 on the tail portions 23,24 after the respective valves have closed but before the respective limit of pivotal movement of the pivoted valve control block 33 is reached. In particular, in FIG. 1 the abutment 26 which engages with projection 37 of the tail portion 24 of the outlet valve 15 is shown separated from that projection 37 so that upon anti-clockwise movement of the control block 33 about fulcrum 20 during change from the fill to the discharge condition, the abutment 26 must travel a certain distance (during which the inlet valve 14 closes the inlet port 12) before engaging with the projection 37 and operating the outlet valve 15 to open the outlet port 13. Similarly, as shown in FIG. 3, the separation between abutment 25 and projection 36 provides lost motion during operation of the inlet valve 14.

The dispenser also includes air bleed means 50 operable when the dispenser is in its discharge condition (FIG. 3) to admit air to the metering chamber 11 facilitating discharge of flowable material therefrom through the outlet port 13, the air bleed means 50 being operated by the valve control member 17 when it reaches its extreme limit of pivotal movement corresponding to the discharge condition of the dispenser. The air bleed means comprises a bleed valve 51 located in the rear wall 22 of the chamber 11 between the inlet and outlet valves 14,15. The bleed valve 51 is normally closed as shown in FIG. 1. The bleed valve has an inwardly projecting head portion 52 which is engaged by the pivoted valve control block 33 when it reaches its extreme limit of pivotal movement in changing from the fill to the discharge condition, engagement of the head portion 52 by the valve control block 33 causing the bleed valve to open as shown in FIG. 3, thereby allowing air to enter the chamber 13 and facilitate discharge of the chamber contents through outlet port 13.

Referring now to FIG. 2, the valve control means 16 is electrically operable and includes timing means (oscillator 80 and microprocessor 81 in Figure 4) operative to generate a timing signal. The valve operating means 19 is electrically operable and is responsive to the timing signal generated by the timing means to change the dispenser from its fill to its discharge condition and to maintain the dispenser in its discharge condition for a predetermined discharge period allowing discharge of flowable material from the metering chamber 11. The valve operating means 19 is also operative to return the dispenser from its discharge to its fill condition after material discharge.

The valve operating means 19 is operative to move the valve control member 17 against the action of the biasing means 18 to effect changing of the dispenser from its fill to its discharge condition. The valve operating means 19 includes a solenoid 61 which is arranged to be energised for the duration of the discharge period so as to change the dispenser from the fill to the discharge condition and to maintain the dispenser in that condition for the duration of the discharge period. The valve control means 16 includes switching means (a function of microprocessor 81 in FIG. 4) operative to switch power to the solenoid 61 for the duration of the discharge period and to disconnect power from the solenoid 61 at the end of the discharge period.

The solenoid 61 has an associated operating member 62 illustrated as a plunger and which is mechanically associated with the valve control member 17 and is operative to move the member 17 from its initial position as shown in FIG. 2 in which the dispenser is in the fill condition against the action of the biasing means 18 to a second position (FIG. 3) in which the dispenser is in its discharge condition and to maintain the valve control member 17 in the second position for as long as the solenoid 61 is energised. The biasing means 18 associated with the valve control member 17 is operative to return the control member 17 to its initial position and hence return the dispenser from its discharge to its fill condition upon deenergisation of the solenoid 61. As shown in FIG. 2, the operating plunger 62 is provided with a laterally projecting pin 63 which engages in a recess 64 provided in the pivoted valve control member.

As with the embodiment described in relation to FIG. 1, there is provided in the electrically operable embodiment of FIG. 2, lost motion means operative so that the inlet valve 14 closes the inlet port 12 before the outlet valve 15 opens the outlet port 13 in changing of the dispenser from its fill to its discharge condition, and also operative so that the outlet valve 15 closes before the inlet valve 14 opens during change of the dispenser from the discharge to the fill condition.

The timing means is operative to generate a discharge timing signal representative of the duration that the dispenser is to be maintained in its discharge condition. The timing means includes a pulse generator illustrated as oscillator 80 in FIG. 4 for generating pulses at a predetermined frequency and counter means (part of microprocessor 81) for determining when a predetermined number of the pulses have been generated so as to determine the discharge period. During the discharge period the microprocessor 81 is operative to apply a signal to solenoid buffer and driver 82 which in turn applies power to solenoid 61 to maintain the solenoid energised. At the end of the discharge period as determined by the counter means, the solenoid 61 is deenergised so that the dispenser changes from its discharge back to its fill condition. The counter means may conveniently comprise a register within the microprocessor 81 and for counting the number of pulses generated together with associated logic means for initiating return of the dispenser from the discharge to the fill condition when a predetermined number of pulses has been counted by the register.

The timing means is further operative to generate a disabling timing signal so as to prevent a restarting of the dispenser operating cycle for a predetermined time after return of the dispenser from the discharge to the fill condition, thereby enabling refilling of the metering chamber 11. The timing means for generating the disabling timing signal may be generally of the same construction and manner of operation as the timing means for generating the discharge timing signal. That is, the timing means may include a pulse generator (e.g. the same oscillator 80) and associated counter means forming part of microprocessor 81 and for determining when a predetermined number of pulses has been generated, the disabling timing signal being generated from the start of the dispenser operating signal until the predetermined number of pulses has been generated, the valve control means 16 being operative to prevent restarting of the dispenser operating cycle from the fill condition until termination of the disabling timing signal.

In the FIG. 4 embodiment, the timing means includes oscillator 80 which generates a pulse train of predetermined frequency, the timing means also including two counters as part of the microprocessor 81, one for determining the discharge period and the second for determining the disabling timing signal period or total cycle period, the total cycle period being longer than the discharge period so that after the end of the discharge period and return of the dispenser from the discharge to the fill condition, the operating cycle continues for a period of time sufficient for the metering chamber 11 to refill. As mentioned above, preferably reactivation of the dispenser to discharge a further quantity of material is prevented until the operating cycle is completed.

The timing means is preferably selectively adjustable so as to enable user selection of different discharge periods less than the period required for complete discharge of the metering chamber contents and thereby allow selection of quantities of material to be dispensed less than the full capacity of the chamber 11. For this purpose, the counter means included in the timing means may be selectively adjustable so that the duration of the discharge period can be selected for enabling discharge of part only of the chamber contents. The quantities to be discharged which can be selected may be continuously variable or in the preferred arrangement, the dispenser may be calibrated so that a limited number of predetermined quantities can be selected. In particular, the dispenser may include a number of manually operable quantity selection switches 83, any one of which can be selected by a user for a respective quantity of material to be dispensed, the quantity selection switches 83 being coupled to the timing means (microprocessor 81) so as to determine the discharge period and hence the quantity of material to be dispensed. In the case of selection of a discharge period less than the time needed for total discharge of the chamber contents, the complete operating cycle of the dispenser may also be of shorter duration. That is, the discharge period is shortened as well as the total cycle period, the difference between the two periods being the time required for the metering chamber 11 to be refilled after return of the dispenser from the discharge to the fill condition, this refill period being capable of being made shorter than the refill period required for refilling of the chamber 11 after complete discharge.

In FIG. 4, the microprocessor and oscillator would, in use, be connected to an appropriate power supply 85. Also, there would be provided appropriate start-up circuitry 86 for providing the desired initial conditions including resetting of registers, etc. The oscillator 80 could be arranged to continuously supply pulses of a predetermined frequency to the microprocessor 81. The microprocessor 81 would include a central processing unit and control logic 87, appropriate input/output ports 88 and appropriate member 90 consisting of a read-only member (ROM) 91 containing the control program and the preprogrammed data values, and a random access memory (RAM) 92 comprising temporary data values retrieved from the ROM 91 during operation. In the preferred embodiment described above where one of several discharge periods can be preselected, there are provided a plurality of quantity selection switches 83, one of which would be user operable for each dispensing operation to select the amount of material to be dispensed. The quantity selection switches 83 are coupled to the input/output ports 88 of the microprocessor 81 together with a main switch 93 which is user operable to initiate a dispensing operating. The microprocessor 81 is coupled so as to drive display lights 94, for example for indicating whichever of the quantity selection switches 83 is chosen by the operator. Also, if desired, the microprocessor 81 can be used to drive, through an appropriate buffer 95, a counter 96 which may be for example an electro-mechanical counter for providing a display of the total quantity of material dispensed to date.

In operation of the valve control means 16 including the microprocessor 81, the user selects the material quantity to be dispensed by closing one of the selection switches 83 and then activates the main switch 93. The microprocessor 81 provides a timing signal to solenoid buffer and driver 82 upon commencement of the operating cycle so as to energise the solenoid 61 and change the dispenser from the fill to the discharge condition. The registers of the microprocessor 81, initially reset to zero, provide a cumulative total of the number of pulses generated by oscillator 80 since the closing of the main switch 93. The microprocessor 81 is programmed to continuously test whether the number of counts in the first or discharge register corresponds to the number preprogrammed for the particular quantity selected and held in RAM 92. When the discharge register count reaches the preprogrammed number, the signal to the solenoid buffer and driver 82 is discontinued, thus deenergising the solenoid 61 and returning the dispenser from the discharge to the fill condition. The second register, which measures the total cycle time is also continuously monitored so that when the second register count reaches the preprogrammed value held in the RAM 92, and corresponding to the total cycle time (longer than the discharge time) the microprocessor 81 and the registers are reset so that the microprocessor 81 is ready to accept a signal for initiating a subsequent dispensing operation.

Preferably, the microprocessor 81 is programmed so as to require a short delay between user operation of one of the quantity selection switches 83 and acceptance of a signal from the main switch 93 in order to commence the dispensing operation. That is, there is provided a short delay between the first sensing of the closure of one of the selection switches 83 and priming of the microprocessor 81 before accepting a start signal from the main switch 93. This delay would inhibit or prevent spurious signals such as noise signals from interfering with the desired operation of the dispenser. Similarly, there may also be provided a short delay between the sensing of the closure of the main switch 93 and the actual initiation of the operating cycle. This delay would enable microprocessor checking that the main operating switch 93 is actually closed before the operating cycle is commenced.

To indicate termination of the discharge period when the solenoid 61 is deenergised, the microprocessor 81 may be programmed to cause flashing of the display light 94 corresponding to the quantity selected thereby indicating to the user that the dispensing operation has been completed, but warning that restarting of the operating cycle is not to be attempted immediately as the dispenser has been returned to the fill condition and some delay is required for the metering chamber 11 to be completely refilled. At the end of the total operating cycle, the display light 94 corresponding to the selected quantity to be dispensed can be illuminated continuously to indicate the quantity whic was last selected and also to indicate that the dispenser is now ready to repeat the cycle operation or to accept a different selection switch operation if a different quantity of material is to be next dispensed.

The flow diagram illustrated in FIG. 5 provides an outline of the programming of the microprocessor 81 such that it will carry out the functions required as earlier described. The flow diagram in FIG. 5 will be understood by those skilled in the art and therefore no detailed description thereof need be given.

The initiation of the operating cycle of the dispneser of FIG. 2 can be achieved by means of a user operable push-button 65 which is associated with a main operating switch 66 (equivalent to main switch 93 in FIG. 4), such as a microswitch and which initiates operation of the timing means.

It will be seen that the preferred construction of the valve control member 17 described herein and illustrated in the accompanying drawings is relatively simple in construction and operation and is suitable for being either mechanically or electrically operated (FIGS. 1 and 2 respectively).

Also, it will be seen that the preferred construction and arrangement of the dispenser as described herein and illustrated in the accompanying drawings is effective in operation. Different quantities of material can be discharged according to user selection. Also, the electrical valve control means may be manufactured relatively cheaply.

Finally, it is to be understood that various alterations, modifications and/or additions can be made to the construction and arrangement of parts as herein described without departing from the scope of the present invention as defined in the appended claims.

We claim:

1. A metering dispenser including a metering chamber having an inlet port and an outlet port, an inlet valve for admitting flowable material to the metering chamber through the inlet port, an outlet valve for allowing discharge of the material from the metering chamber through the outlet port, and valve control means operative to control operation of the inlet and outlet valves so as to change the condition of the metering dispenser between a fill condition in which the inlet port is open and the outlet port is closed and a discharge condition in which the outlet port is open and the inlet port is closed, said valve control means including: a rigid valve control member engaging both the inlet and outlet valves and being pivotally movable between two extreme limits of pivotal movement which correspond respectively to the fill and discharge conditions, control biasing means associated with the valve control member and which continuously biases the valve control member towards an initial position being the one of said extreme limits of pivotal movement corresponding to the dispenser being in the fill condition, and actuating means operative to move the valve control member against the action of the biasing means to change the dispenser from its fill condition to its discharge condition and to maintain the dispenser in the discharge condition against the action of the biasing means for predetermined time allowing discharge of material from the metering chamber through the outlet port, the actuating means being operative, after material discharge, to allow the valve control member to return entirely under the continuous action of the control biasing means to its said initial position in which the dispenser is in the fill condition.

2. A metering dispenser as claimed in claim 1 wherein the valve control member is pivotally movable about a point located between said inlet and outlet valves.

3. A metering dispenser as claimed in claim 1 wherein the metering chamber includes a rear wall, the inlet and outlet valves having rearwardly extending tail portions which extend beyond the rear wall and which are operated upon to open the inlet and outlet ports, said pivoted valve control member being mounted between the tail portions of the inlet and outlet valves and having operating portions associated with the respective tail portions, each of the inlet and outlet valves including a respective associated valve biasing means biasing the associated valve to its port closing position, the strength of the biasing force of the valve biasing means being less than the strength of the biasing force of the control biasing means, whereby in the fill condition of the dispenser the inlet valve holds the inlet port open against the closing force of the associated valve biasing means and the outlet valve holds the outlet port closed under the action of the associated valve biasing means.

4. A metering dispenser as claimed in claim 3 wherein the valve control member comprises a pivoted block located rearwardly of the rear wall of the metering chamber and between the inlet and outlet valve tail portions, the block being pivotally mounted on a fulcrum located rearwardly of the rear wall and generally centrally between the inlet and outlet valve tail portions.

5. A metering dispenser as claimed in claim 4 wherein each of the tail portions of the inlet and outlet valves is provided with a head portion, each of said operating portions comprising an abutment on the valve control block, each head portion being arranged to be engaged by the respective abutment when the valve control block is pivoted about the fulcrum so as to move the tail portion of the valve and thereby operate the respective valve to open the respective port.

6. A metering dispenser as claimed in claim 1 wherein the control biasing means is directly associated with the valve control member so as to act directly thereon and bias the valve control member to is extreme limit of pivotal movement corresponding to the fill condition of the dispenser.

7. A metering dispenser as claimed in claim 6 including a valve body and wherein the control biasing means comprises a spring extending between the pivoted valve control member and a portion of the valve body, the point of connection of the spring to the valve control member being located to one side of the fulcrum so that the spring urges the valve control member into its extreme limit of pivotal movement corresponding to the fill condition and of the dispenser.

8. A metering dispenser as claimed in claim 1 wherein the actuating means is operative, after causing change of the dispenser from its fill to its discharge condition, to prevent return of the valve control member to its initial position for a predetermined time until a predetermined proportion of the material in the metering chamber is discharged.

9. A metering dispenser as claimed in claim 1 wherein the actuating means comprises a mechanical actuating means operative initially to move the valve control member against the action of the control biasing means to change the dispenser from its fill condition to its discharge condition and to delay return of the valve control member to its initial position for a sufficient period of time to allow discharge of the flowable material, the actuating means including a manually operable plunger movable in response to user actuation and causing movement of the valve control member from its initial position to its other extreme limit of pivotal movement corresponding to the discharge condition of the dispenser.

10. A metering dispenser as claimed in claim 9 wherein the plunger includes a lateral projection and the valve control member includes a projecting operating arm, initial movement of the plunger causing the lateral projection to engage with the operating arm and further movement of the plunger causing pivotal movement of the valve control member causing closure of the inlet port and opening of the outlet port.

11. A metering dispenser as claimed in claim 1 wherein the valve control means is electrically operable for changing the dispenser between its fill and discharge conditions, the electrically operable valve control means including timing means operative to generate a timing signal and electrically operable valve operating means which is responsive to the timing signal to change the dispenser from its fill to its discharge condition and to maintain the dispenser in its discharge condition for a predetermined discharge time allowing discharge of the flowable material from the metering chamber, the valve operating means being also operative to allow return of the dispenser from its discharge to its fill condition and after contents discharge under the continuous action of the control biasing means.

12. A metering dispenser as claimed in claim 11 wherein the valve operating means includes a solenoid which is arranged to be energised for the duration of the discharge period so as to change the dispenser from the fill to the discharge condition and maintain the dispenser in that condition for the duration of the discharge period, the valve control means including switching means operable to switch power to the solenoid for the duration of the discharge period and to disconnect power from the solenoid at the end of the discharge period, and solenoid ahving an associated operating member movable in response to energisation of the solenoid, the operating member being operative to pivotally move the valve control member against the action of the control biasing means to change the dispenser from the fill to the discharge condition and to hold the valve control member for the duration of the discharge period.

13. A metering dispenser as claimed in claim 12 wherein, before the outlet valve has been operated to open the outlet port during the change from the fill to the discharge condition, the valve control member disengages from the inlet valve after it has closed so that when the dispenser is returning from the discharge to the fill condition, the valve control member allows the outlet valve to close the outlet port before re-engaging with the inlet valve and opening the inlet port.

14. A metering dispenser as claimed in claim 1 and including lost motion means operative so that the inlet valve closes the inlet port before the outlet valve opens the outlet port in changing of the dispenser from its fill condition to its discharge condition.

15. A metering dispenser as claimed in claim 14 wherein the lost motion means is provided by a degree of free travel of the valve control member which, starting its pivotal movement from its initial extreme limit of pivotal movement in which the dispenser is in the fill condition, allows the inlet valve to close the inlet port before the valve control member operates the outlet valve to open the outlet port and achieve the discharge condition.

16. A metering dispenser as claimed in claim 15 wherein the lost motion means is also operative so that in changing of the dispenser from its discharge to its fill condition, the outlet valve closes the outlet port before the inlet valve opens the inlet port.

17. A metering dispenser as claimed in claim 1 and further including air bleed means operable when the dispenser is in its discharge condition to admit air to the metering chamber facilitating discharge of flowable material therefrom through the outlet port, the air bleed means being operated by the valve control member when it reaches its extreme limit of pivotal movement corresponding to the discharge condition of the dispenser.

18. A metering dispenser including a metering chamber having an inlet port and an outlet port, an inlet valve for admitting flowable material to the metering chamber through the inlet port, an outlet valve for allowing discharge of the material from the metering chamber through the outlet port, and valve control means operative to control operation of the inlet and outlet valves so as to change the condition of the metering dispenser between a fill condition in which the inlet port is open and the outlet port is closed and a discharge condition in which the outlet port is open and the inlet port is closed, said valve control means including: a rigid valve control member engaging both the inlet and outlet valves and being pivotally movable between two extreme limits of pivotal movement which correspond respectively to the fill and discharge conditions, control biasing means associated with the valve control member and which continuously biases the valve control member towards an initial position being the one of said extreme limits of pivotal movement corresponding to the dispenser being in the fill condition, and actuating means operative to move the valve control member against the action of the biasing means to change the dispenser from its fill condition to its discharge condition and to maintain the dispenser in the discharge condition against the action of the biasing means for a predetermined time allowing discharge of material from the metering chamber through the outlet port, said actuating means comprising a mechanical actuating means operative initially to move the valve control member against the action of the control biasing means to change the dispenser from its fill condition to its discharge condition and to delay return of the valve control member to its initial position for said predetermined time being a sufficient period of time to allow discharge of the flowable material, the actuating means including a manually operable plunger movable from a first position in response to user actuation and causing movement of the valve control member from its initial position to its other extreme limit of pivotal movement corresponding to the discharge condition of the dispenser, said plunger including a lateral projection and the valve control member including a projecting operating arm, initial movement of the plunger away from its said first position causing the lateral projection to engage with the operating arm and further movement of the plunger causing pivotal movement of the valve control member causing closure of the inlet port and opening of the outlet port, the operating arm of the valve control member when the dispenser reaches its discharge condition being maintained in contact with the lateral projection of the plunger by action of the control biasing means so that the plunger projection prevents immediate return of the valve control member to its initial position, the acutating means being operative after said predetermined time to allow the plunger to return to its said first position so as to allow the valve control member to return entirely under the continuous action of the control biasing means to its said initial position in which the dispenser is in the fill condition.

19. A metering dispenser including a metering chamber having an inlet port and an outlet port, an inlet valve for admitting flowable material to the metering chamber through the inlet port, an outlet valve for allowing discharge of the material from the metering chamber through the outlet port, and valve control means operative to control operation of the inlet and outlet valves so as to change the condition of the metering dispenser between a fill condition in which the inlet port is open and the outlet port is closed and a discharge condition in which the outlet port is open and the inlet port is closed, said valve control means including: a rigid valve control member engaging both the inlet and outlet valves and being pivotally movable between two extreme limits of pivotal movement which correspond respectively to the fill and discharge conditions, control biasing means associated with the valve control member and which continuously biases the valve control member towards an initial position being the one of said extreme limits of pivotal movement corresponding to the dispenser being in the fill condition, and actuating means operative to move the valve control member against the action of the biasing means to change the dispenser from its fill condition to its discharge condition and to maintain the dispenser in the discharge condition against the action of the biasing means for a predetermined time allowing discharge of material from the metering chamber through the outlet port, the valve control means being electrically operable for changing the dispenser between its fill and discharge conditions, the electrically operable valve control means including timing means operative to generate a timing signal and electrically operable valve operating means which is responsive to the timing signal to change the dispenser from its fill to its discharge condition and to maintain the dispenser in its discharge condition for a predetermined time allowing discharge of the flowable material from the metering chamber, the valve operating means including a solenoid which is arranged to be energised for said predetermined time so as to change the dispenser from the fill to the discharge condition and maintain the dispenser in that condition for said predetermined time, the valve control means including switching means operable to switch power to the solenoid for said predetermined time and to disconnect power from the solenoid at the end of said predetermined time, the solenoid having an associated operating member movable in response to energisation of the solenoid, the operating member being provided with a laterally projecting pin which engages in a recess provided in the pivoted valve control member so that the operating member pivotally moves the valve control member against the action of the biasing means upon energisation of the solenoid to change the dispenser from the fill to the discharge condition and to hold the valve control member for the duration of said predetermined time, said operating member being movable after said predetermined time to allow the valve control member to return to its said initial position entirely under the continuous action of the control biasing means.

20. A metering dispenser including a metering chamber having an inlet port and an outlet port, an inlet valve for admitting flowable material to the metering chamber through the inlet port, an outlet valve for allowing discharge of material from the metering chamber through the outlet port, and valve control means operative to control operation of the inlet and outlet valves so as to change the condition of the dispenser between a fill condition in which the inlet port is opened and the outlet port is closed and a discharge condition in which the outlet port is opened and the inlet port is closed, said valve control means including a rigid valve control member engaging both the inlet and outlet valves and being pivotally movable between two extreme limits of movement corresponding respectively to the fill and discharge conditions, control biasing means associated with the valve control member so as to continuously bias the valve control member toward one of said extreme limits of pivotal movement corresponding to the fill condition, said valve control means being electrically operable and including timing means operative to generate a discharge timing signal representative of the duration that the dispenser is to be maintained in its discharge condition, the timing means including a pulse generator for generating pulses at a predetermined frequency and counter means for determining when a predetermined number of said pulses has been generated so as to determine the duration of a discharge period during which the dispenser ia maintained in its discharge condition allowing discharge of flowable material from the metering chamber, said valve control means further including electrically operable valve operating means operative in response to the discharge timing signal generated by the timing means to change the dispenser from its fill to its discharge condition and to maintain the dispenser in its discharge condition for the discharge period, the valve operating means being also operative to allow the valve control member to return the dispenser from its discharge to its fill condition at the end of said discharge period, entirely under the continuous action of the control biasing means, the timing means being further operative to generate a disabling timing signal so as to prevent a restarting of the dispenser operating cycle for a predetermined time after return of the dispenser from the discharge to the fill condition, thereby enabling refilling of the metering chamber.

21. A metering dispenser as claimed in claim 20 wherein the timing means is selectively adjustable so as to enable user selection of different discharge periods less than the period required for complete discharge of the metering chamber contents and thereby allow selection of quantities of material to be dispensed less than the full capacity of the metering chamber.

22. A metering dispenser as claimed in claim 21 and further including a number of manually operable quantity selection switches, any one of which can be selected by a user for a respective quantity of material to be dispensed, the quantity selection switches being coupled to the timing means so as to determine the discharge period and hence the quantity of material to be dispensed.

23. A metering dispenser as claimed in claim 22 and further including a main switch which is user operable to initiate a dispensing operation, the valve control means requiring a short delay between user operation of one of the quantity selection switches and acceptance of a signal from the main switch in order to commence the dispensing operation.

24. A metering dispenser including a metering chamber having an inlet port and an outlet port, an inlet valve for admitting flowable material to the metering chamber through the inlet port, an outlet valve for allowing discharge of the material from the metering chamber through the outlet port, and valve control means operative to control operation of the inlet and outlet valves so as to change the condition of the metering dispenser between a fill condition in which the inlet port is open and the outlet port is closed and a discharge condition in which the outlet port is open and the inlet port is closed, said valve control means including: a rigid valve control member engaging both the inlet and outlet valves and being pivotally movable about a fulcrum between two extreme limits of pivotal movement which correspond respectively to the fill and discharge conditions, control biasing means comprising a spring extending from the pivoted valve control member, the point of connection of the spring to the valve control member being located to one side of the fulcrum and the spring applying biasing force to the valve control member so as to continuously urge the valve control member into an initial position being its extreme limit of pivotal movement corresponding to the fill condition of the dispenser, and the valve control means further including actuating means operative to move the valve control member against the action of the spring to change the dispenser from its fill condition to its discharge condition for a predetermined time allowing discharge of material from the metering chamber through the outlet port, the actuating means being operative, after material discharge, to allow the valve control member to return under the action of the spring to its said initial position in which the dispenser is in the fill condition.

* * * * *